(12) United States Patent
Hui et al.

(10) Patent No.: US 7,978,788 B2
(45) Date of Patent: Jul. 12, 2011

(54) METHOD AND ARRANGEMENT FOR ESTIMATING DC OFFSET

(75) Inventors: Dennis Hui, Cary, NC (US); Rajaram Ramesh, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 871 days.

(21) Appl. No.: 11/993,605

(22) PCT Filed: Jul. 1, 2005

(86) PCT No.: PCT/IB2005/001880
§ 371 (c)(1),
(2), (4) Date: Dec. 21, 2007

(87) PCT Pub. No.: WO2007/003979
PCT Pub. Date: Jan. 11, 2007

(65) Prior Publication Data
US 2010/0040174 A1 Feb. 18, 2010

(51) Int. Cl.
*H04L 25/06* (2006.01)

(52) U.S. Cl. ........ 375/319; 375/316; 375/317; 375/320; 329/321

(58) Field of Classification Search .................... 375/319
See application file for complete search history.

(56) References Cited

U.S. PATENT DOCUMENTS

| | | | |
|---|---|---|---|
| 5,652,541 A | 7/1997 | Yang et al. | |
| 5,748,681 A * | 5/1998 | Comino et al. | 375/319 |
| 6,327,313 B1 * | 12/2001 | Traylor et al. | 375/316 |
| 6,370,205 B1 * | 4/2002 | Lindoff et al. | 375/319 |
| 6,442,383 B1 * | 8/2002 | Iemura | 455/312 |
| 6,449,320 B1 * | 9/2002 | Lindoff | 375/319 |
| 6,498,929 B1 * | 12/2002 | Tsurumi et al. | 455/296 |
| 6,643,336 B1 * | 11/2003 | Hsieh et al. | 375/343 |

(Continued)

FOREIGN PATENT DOCUMENTS

JP 2002 135347 A 5/2002

OTHER PUBLICATIONS

Gil G et al.: "Joint ML Estimation of I/Q mismatch, DC offset, carrier frequency, and channel for direct-conversion receivers" IEEE Vehicular Technology Conference, vol. 4, Apr. 22, 2003 pp. 2348-2352, XP010862268 IEEE, New York, NY US ISBN: 0-7803-7757-5 ISBN: 0-7803-7757-5 p. 2348, col. 2, paragraph 2 p. 2349, Section III.

(Continued)

*Primary Examiner* — Chieh M Fan
*Assistant Examiner* — Santiago Garcia

(57) ABSTRACT

A method and arrangement for estimating a DC offset for a signal received in a radio receiver. The received signal includes a digitally modulated signal component, a DC offset component, and a noise component. When the signal is of a known type, such as a Gaussian Minimum Shift Keying (GMSK)-modulated signal with constant amplitude in a GSM/EDGE cellular radio system, the method exploits the known characteristics of the statistical distribution for the known type of signal to obtain a better estimate of the DC offset. The statistical distribution of the received digitally modulated signal component is first analyzed. That statistical distribution is then compared to the known statistical distribution for the known type of signal to identify differences. The differences are then used to estimate the DC offset. Additional iterations may be performed to further improve the DC estimate.

25 Claims, 12 Drawing Sheets

U.S. PATENT DOCUMENTS

| | | | |
|---|---|---|---|
| 6,724,247 B2 * | 4/2004 | Mattisson et al. | 329/318 |
| 6,725,024 B1 * | 4/2004 | Lindoff et al. | 455/255 |
| 6,757,340 B1 * | 6/2004 | Jakobsson | 375/319 |
| 6,947,495 B2 * | 9/2005 | Ezquerra-Moreu et al. | 375/319 |
| 6,947,496 B2 * | 9/2005 | Ezquerra-Moreu et al. | 375/319 |
| 7,035,350 B2 * | 4/2006 | Yuan et al. | 375/319 |
| 7,035,589 B1 * | 4/2006 | Meng et al. | 455/63.1 |
| 7,079,595 B2 * | 7/2006 | Jensen et al. | 375/319 |
| 7,120,206 B2 * | 10/2006 | Schetelig et al. | 375/319 |
| 7,167,530 B2 * | 1/2007 | Koomullil et al. | 375/329 |
| 7,190,740 B2 * | 3/2007 | Chu et al. | 375/319 |
| 7,215,722 B2 * | 5/2007 | Hsiao | 375/319 |
| 7,221,717 B2 * | 5/2007 | Yuan et al. | 375/319 |
| 7,231,000 B2 * | 6/2007 | Yuan | 375/319 |
| 7,266,160 B2 * | 9/2007 | Kocic et al. | 375/319 |
| 7,280,617 B2 * | 10/2007 | Cuje et al. | 375/319 |
| 7,324,609 B1 * | 1/2008 | Hwang et al. | 375/319 |
| 7,388,936 B2 * | 6/2008 | Kocic et al. | 375/346 |
| 2003/0058964 A1 * | 3/2003 | Ezquerra-Moreu et al. | 375/319 |
| 2003/0203728 A1 * | 10/2003 | Filipovic | 455/234.2 |
| 2005/0084039 A1 * | 4/2005 | Kocic et al. | 375/319 |
| 2006/0129410 A1 * | 6/2006 | Reisenfeld et al. | 704/278 |
| 2006/0193371 A1 * | 8/2006 | Maravic | 375/130 |
| 2007/0097718 A1 * | 5/2007 | Nahar et al. | 363/65 |

OTHER PUBLICATIONS

Hung Nguyen: "Improving QPSK demodulator performance for quadrature receiver with information from amplitude and phase imbalance correction" 2000 IEEE Wireless Communications & Networking Conference, vol. 3, 2000 pp. 1440-1444, XP002373581 IEEE, Piscataway, NJ ISBN: 0-7803-6596-8 p. 1441, col. 1. paragraph 1. p. 1441, col. 2.

* cited by examiner

METHOD AND ARRANGEMENT FOR ESTIMATING DC OFFSET

TECHNICAL FIELD OF THE INVENTION

The present invention relates generally to radio communication networks. More particularly, and not by way of limitation, the present invention is directed to a method and arrangement for estimating a DC offset in a radio receiver.

DESCRIPTION OF RELATED ART

A direct conversion radio receiver converts a received radio signal directly down to baseband without any use of intermediate frequencies and thus reduces the number of required circuit components compared to a conventional heterodyne receiver. The direct conversion receiver architecture has become increasingly popular for mobile terminals because the architecture is power-efficient and cost-effective.

Direct conversion receiver architectures, however, often suffer from a DC-offset problem, which is a by-product of the direct conversion process. The simplest method of estimating the DC offset is to average the received signal over a given time period. However, this method does not provide an accurate enough estimate for the DC offset at moderate to high operating ranges of signal-to-noise ratio (SNR), especially with a short averaging time. A performance loss of about 0.4 dB loss has been observed with a static Adaptive White Gaussian Noise (AWGN) channel in the GSM/EDGE system when the simple average of received signal over each burst is used to compensate for the DC offset.

In a GSM/EDGE cellular system, which uses frequency hopping, data is sent in bursts. The induced DC offset often varies significantly from one data burst to another due to the frequency hopping. Therefore, the DC offset cannot be accurately estimated by averaging the received signal over one or even several bursts.

Another known method is to jointly estimate the DC offset along with the channel response over the training period of each burst. This is a feasible method with the use of a simple channel-estimation algorithm, such as least-squares channel estimation. However, for a more complex channel estimation algorithm such as that adopted in an advanced Single Antenna Interference Cancellation (SAIC) receiver, joint estimation with DC offset makes the resulting algorithm significantly more complex and thus incurs a much higher implementation cost.

Accordingly, there is a need for a method and arrangement for accurately and efficiently estimating DC offset in a radio receiver. The present invention provides such a method and arrangement.

SUMMARY OF THE INVENTION

The present invention is directed to a method of estimating a DC offset for a signal received in a radio receiver, wherein the received signal includes a digitally modulated signal component, a DC offset component, and a noise component. The digitally modulated signal component has a statistical distribution, which the method exploits to improve the estimate of the DC offset. The exact statistical distribution of the signal component may not be known at the receiver, but the receiver generally has enough knowledge of the transmitted signal and the environment to postulate a close approximation to the statistical distribution of the digitally modulated signal component. The method includes estimating at least one parameter of a postulate of the statistical distribution of the digitally modulated signal component, and estimating the DC offset utilizing the at least one estimated parameter of the postulate of the statistical distribution of the digitally modulated signal component.

In one aspect, the method postulates that the digitally modulated signal component has a substantially constant amplitude. The method includes initializing an iteration index; initializing estimates of the DC offset, the amplitude of the digitally modulated signal component, and the standard deviation of the noise component; and estimating a complex exponential of the phase of the digitally modulated signal component. The method also includes updating the estimate of the amplitude of the digitally modulated signal component utilizing the estimate of the complex exponential of the phase; updating the estimate of the DC offset; and updating the estimate of the DC offset utilizing the estimate of the complex exponential of the phase and the estimate of the amplitude of the digitally modulated signal component.

It is noted that the order in which the amplitude and the DC offset are estimated may be reversed while keeping within the scope of the present invention. In one aspect, after the complex phase exponential is estimated, the amplitude of the digitally modulated signal component is estimated, and then the estimated amplitude together with the received signal are utilized to estimate the DC offset. The estimated amplitude, the estimated DC offset, and the received signal are then utilized to estimate the noise standard deviation when additional iterations are performed. In an alternative approach, after the complex phase exponential is estimated, the DC offset is estimated, and then the estimated DC offset together with the received signal are utilized to estimate the amplitude of the digitally modulated signal component. The estimated DC offset, the estimated amplitude, and the received signal are then utilized to estimate the noise standard deviation when additional iterations are performed.

The method may also include determining whether a predefined stopping criterion has been met. If the predefined stopping criterion has been met, the estimated DC offset is subtracted from the received signal, which may then be passed to a demodulator or equalizer. If the predefined stopping criterion has not been met, additional iterations are performed utilizing the newly estimated values from the previous iteration until the predefined stopping criterion is met.

In another aspect, the present invention is directed to a method of estimating a DC offset for a signal received in a radio receiver, wherein the received signal includes a digitally modulated signal component having a statistical distribution, a DC offset component, and a noise component. The method includes initializing an iteration index and initializing a joint estimate of at least one parameter of a postulate of the statistical distribution of the digitally modulated signal component, the DC offset, and the noise variance. The method estimates a conditional mean and a conditional variance of the digitally modulated signal component, given the received signal and the initial joint estimate in a first iteration. The method then uses the conditional mean and conditional variance to update the joint estimate. The DC offset is then estimated utilizing the updated joint estimate and the estimated conditional mean and conditional variance. The method may iterate between these steps and may include a stopping criterion to determine when the iterations have sufficed. If the stopping criterion has been met, the estimated DC offset is subtracted from the received signal before it is passed to a suitable demodulator or equalizer.

In yet another aspect, the present invention is directed to an arrangement in a radio receiver for estimating a DC offset for a received signal that includes a digitally modulated signal component having a statistical distribution, a DC offset component, and a noise component. The arrangement includes means for estimating at least one parameter of a postulate of the statistical distribution of the digitally modulated signal component; and means for estimating the DC offset utilizing the estimated at least one parameter.

In yet another aspect, the present invention is directed to an arrangement in a radio receiver for estimating a DC offset for a received signal that includes a digitally modulated signal component having a statistical distribution, a DC offset component, and a noise component. The arrangement includes means for initializing an iteration index; an initialization unit for initializing estimates of the DC offset, the amplitude of the digitally modulated signal component, and the standard deviation of the noise component; and a phase exponential estimator for estimating a complex exponential of the phase of the digitally modulated signal component. The arrangement also includes an amplitude estimator for updating the estimate of the amplitude of the digitally modulated signal component utilizing the estimated complex exponential of the phase of the digitally modulated signal component; and a DC offset estimator for updating the estimate of the DC offset utilizing the estimated complex exponential of the phase of the digitally modulated signal component and the estimated amplitude. The arrangement may also include means for estimating a standard deviation of the noise component for use in additional iterations of the DC offset estimate or for use in further processing of the signal in the receiver.

In still yet another aspect, the present invention is directed to an arrangement in a radio receiver for estimating a DC offset for a received signal, wherein the received signal includes a digitally modulated signal component having a statistical distribution, a DC offset component, and a noise component. The arrangement includes means for initializing an iteration index; an initialization unit for initializing estimates of the DC offset, the amplitude of the digitally modulated signal component, and the standard deviation of the noise component; and a phase exponential estimator for estimating a complex exponential of the phase of the digitally modulated signal component. The arrangement also includes a DC offset estimator for updating the estimate of the DC offset utilizing the estimated complex exponential of the phase of the digitally modulated signal component. The arrangement may also include means for updating the estimate of the amplitude of the digitally modulated signal component, and means for estimating a standard deviation of the noise component for use in additional iterations of the DC offset estimate or for use in further processing of the signal in the receiver.

In still yet another aspect, the present invention is directed to an arrangement in a radio receiver for estimating a DC offset for a received signal, wherein the received signal includes a digitally modulated signal component having a statistical distribution, a DC offset component, and a noise component. The arrangement includes means for initializing an iteration index; and an initialization unit for initializing a joint estimate of at least one parameter of a postulate of the statistical distribution of the digitally modulated signal component, the DC offset, and the noise variance. The arrangement also includes means for estimating a conditional mean and conditional variance of the digitally modulated signal component of the received signal utilizing the initial joint estimate in a first iteration; means for updating the joint estimate utilizing the estimated conditional mean and conditional variance; and means for estimating the DC offset utilizing the estimated conditional mean and conditional variance, and the updated joint estimate.

DETAILED DESCRIPTION OF EMBODIMENTS

The present invention provides an improved estimate of the DC offset in a radio receiver, particularly at moderate to high signal-to-noise ratio (SNR). At low SNR with an AWGN channel, the simple average of the received signal is nearly optimal. However, at moderate to high SNR, using the simple average causes a significant loss of performance. The present invention exploits the statistical distribution of the desired signal to improve DC estimation. The invention provides improved DC estimation at all levels of SNR while minimizing computational complexity. The embodiments described herein focus on a special case in which the desired signal is a digitally modulated signal with constant amplitude, such as the Gaussian Minimum Shift Keying (GMSK)-modulated signal in a GSM/EDGE cellular system. However, the invention is also applicable to other, non-Gaussian, distributions as discussed below.

In a GMSK-modulated signal, the distribution of the overall signal includes the distribution of the digitally modulated signal, plus some DC offset, plus some noise. By exploiting that knowledge, the invention provides an improved method of estimating the DC component. Consider the following simple signal model in which r[n] denotes the received signal at time n:

$$r[n] = ae^{j\Theta[n]} + d + v[n], \qquad (1)$$

for n=1, 2, ... N, where N denotes the length of the entire burst of received signal r[n]; $a \geq 0$ denotes the amplitude of the desired digitally modulated signal; $\Theta[n]$ denotes the phase of the desired signal at time n (thus u[n]=exp{jΘ[n]} denotes the complex exponential of the phase); d denotes the DC offset; and {v[n]} denotes an IID zero-mean Gaussian noise process with variance $\sigma^2$. We assume that {Θ[n]} is an IID random process whose marginal distribution is uniform over [0,2π].

The invention computes the maximum-likelihood (ML) joint estimate of (d,a,σ) defined as:

$$(\hat{d}_{ML}, \hat{a}_{ML}, \hat{\sigma}_{ML}) = \underset{(d,a,\sigma)}{\arg\max} \ln p(\{r[n]\}_{n=1}^{N} \mid d, a, \sigma) \quad (2)$$

$$= \underset{(d,a,\sigma)}{\arg\max} \prod_{n=1}^{N} \left[ \frac{1}{2\pi} \int_0^{2\pi} \frac{1}{\pi\sigma^2} \exp\left\{ -\frac{\left| r[n] - ae^{j\theta[n]} - d \right|^2}{\sigma^2} \right\} d\theta[n] \right]$$

using an iterative approach. For notational simplicity, we define $\overline{x[n]} \equiv N^{-1}\sum_{n=1}^{N} x[n]$ [note change] as the time average of x[n] from n=1 to N for any x[n]. (So the conventional DC estimate is just $\hat{d} = \overline{r[n]}$.)

Two embodiments of the invention applicable to GSM, and a third embodiment applicable to other, non-Gaussian, distributions are described herein. Regarding the GSM embodiments, the first embodiment may provide a faster convergence than the second embodiment, but each iteration of the second embodiment has slightly lower computational complexity.

Figure 1:
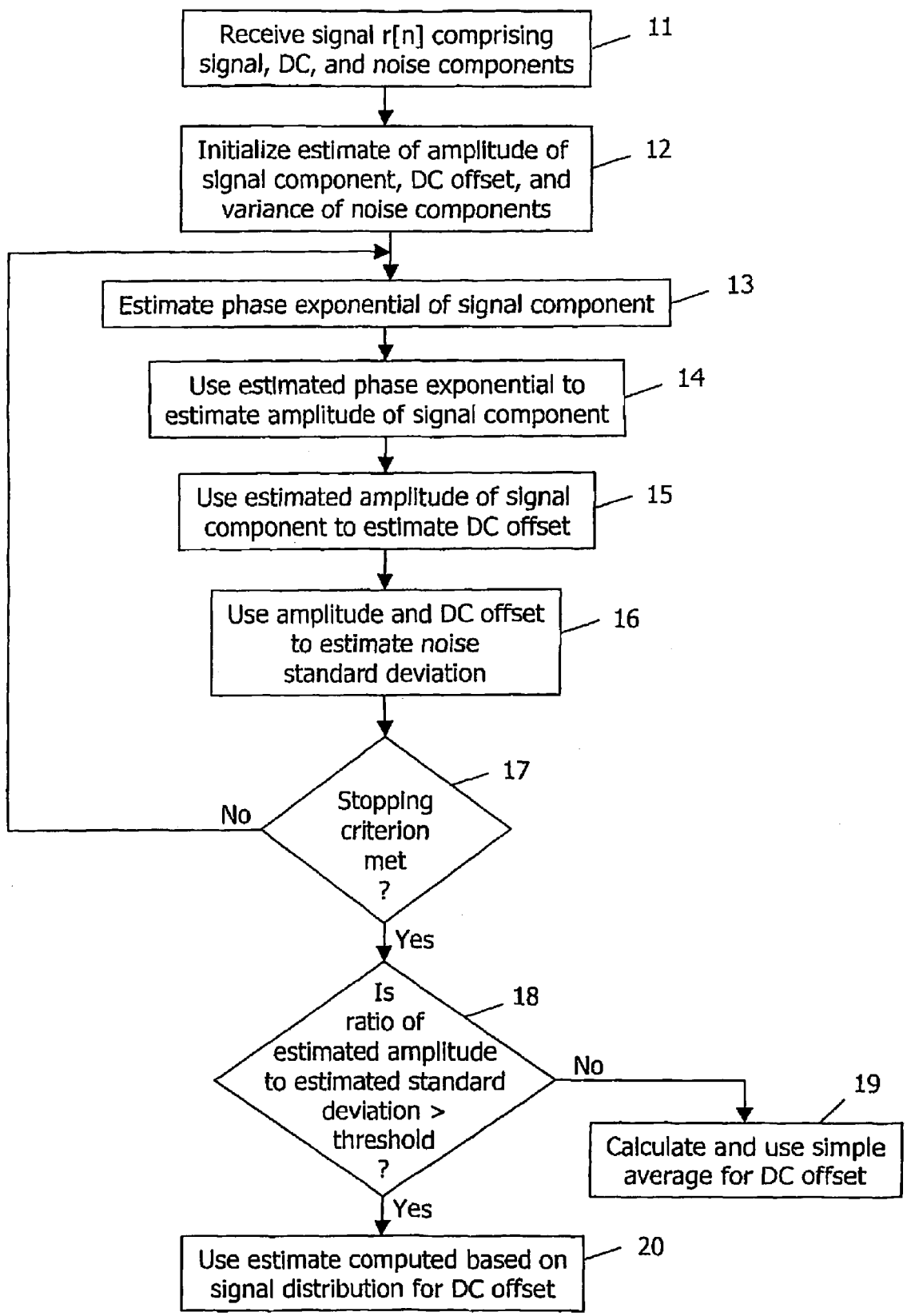
FIG. 1 is a flow chart illustrating the steps of a first embodiment of the method of the present invention.

FIG. 1 is a flow chart illustrating the steps of a first embodiment of the method of the present invention. At step 11, a signal r[n] comprising a digitally modulated signal component, a DC offset component, and a noise component is received. At this point, the process initializes the iteration index m=0 and at step 12, initializes the joint estimate ($\hat{a}^{(0)}$, $\hat{d}^{(0)}$, $\hat{\sigma}^{(0)}$), preferably as:

$\hat{a}^{(0)} = \overline{r[n]}, \hat{d}^{(0)} = \overline{|r[n] - \hat{d}^{(0)}|}$, and $(\hat{\sigma}^{(0)})^2 = \overline{|r[n] - \hat{d}^{(0)}|^2} - (\hat{a}^{(0)})^2$ At step 13, the process estimates the complex exponential of the phase of the signal component. The process computes the estimate of u[n] for n=1,2,Λ,N as:

$$\hat{u}[n] = \frac{I_1\left(2\frac{\hat{a}^{(m)}|r[n] - \hat{d}^{(m)}|}{(\hat{\sigma}^{(m)})^2}\right)}{I_0\left(2\frac{\hat{a}^{(m)}|r[n] - \hat{d}^{(m)}|}{(\hat{\sigma}^{(m)})^2}\right)} e^{j \text{ang}(r[n] - \hat{d}^{(m)})} \quad (3)$$

where ang(x) denotes the phase of the complex number x in the interval [0,2π] and $I_k(z)$ denotes the kth order modified Bessel functions of the first kind. At step 14, the estimated phase exponential is used to estimate the amplitude of the signal component. The process may update the joint estimate as:

$$\hat{a}^{(m+1)} = \frac{\text{Re}\{\hat{u}^*[n]r[n] - \hat{u}^*[n]\overline{r[n]}\}^+}{1 - |\overline{\hat{u}[n]}|^2} \quad (4)$$

$$\hat{d}^{(m+1)} = \overline{r[n]} - \hat{a}^{(m+1)}\overline{\hat{u}[n]} \quad (5)$$

$$(\hat{\sigma}^{(m+1)})^2 = \overline{|r[n] - \hat{d}^{(m+1)}|^2} - (\hat{a}^{(m+1)})^2 \quad (6)$$

where $z^+$ is equal to z if z>0 and is equal to 0 if z≤0 for any real number z.

At step 15, the amplitude is utilized to find the DC estimate. At step 16, the amplitude and DC estimate are then used to calculate the noise variance, $\sigma^2$, wherein $\sigma^2$ is the noise variance while σ is the noise standard deviation. At step 17, it is determined whether a stopping criterion has been met. The stopping criterion may be, for example, a number of iterations such as two iterations, or a more numerical criterion may be utilized such as when the ratio between the variance in the current step and the variance in the previous step stabilizes or falls below a predefined threshold. If the stopping criterion has not been met, the process increments m and returns to step 13.

If the stopping criterion has been met, the process moves to step 18 where an adaptive selection is made between the simple average and the DC estimate produced by the present invention by determining whether or not the ratio of the estimated amplitude to the estimated noise standard deviation is greater than a predefined threshold value. If not, the process moves to step 19 where the simple average is calculated and used for the DC offset. However, if the ratio of the estimated amplitude to the estimated noise standard deviation is greater than the pre-defined threshold, the process moves to step 20 where the DC estimate produced by the present invention is utilized.

Alternatively, the adaptive selection between the simple average and the DC estimate produced by the present invention may be based on the log likelihood test:

$$\sum_{n=1}^{N} \ln \frac{\frac{1}{2\pi} \int_0^{2\pi} \exp\left\{-\frac{|r[n] - \hat{a}e^{j\theta[n]} - \hat{d}|^2}{\hat{\sigma}^2}\right\} d\theta[n]}{\exp\left\{-\frac{|r[n] - \hat{d}|}{\hat{\sigma}^2}\right\}} \gtrless \gamma$$

where the numerator is proportional to the likelihood function for the hypothesis with a constant-envelope component in the signal model, and where the denominator is proportional to the likelihood function for the "null" hypothesis with no constant-envelope component, and γ denotes a pre-defined threshold. However, the invention as described is fairly robust, and further addition of adaptive switching may not be necessary.

Figure 2:
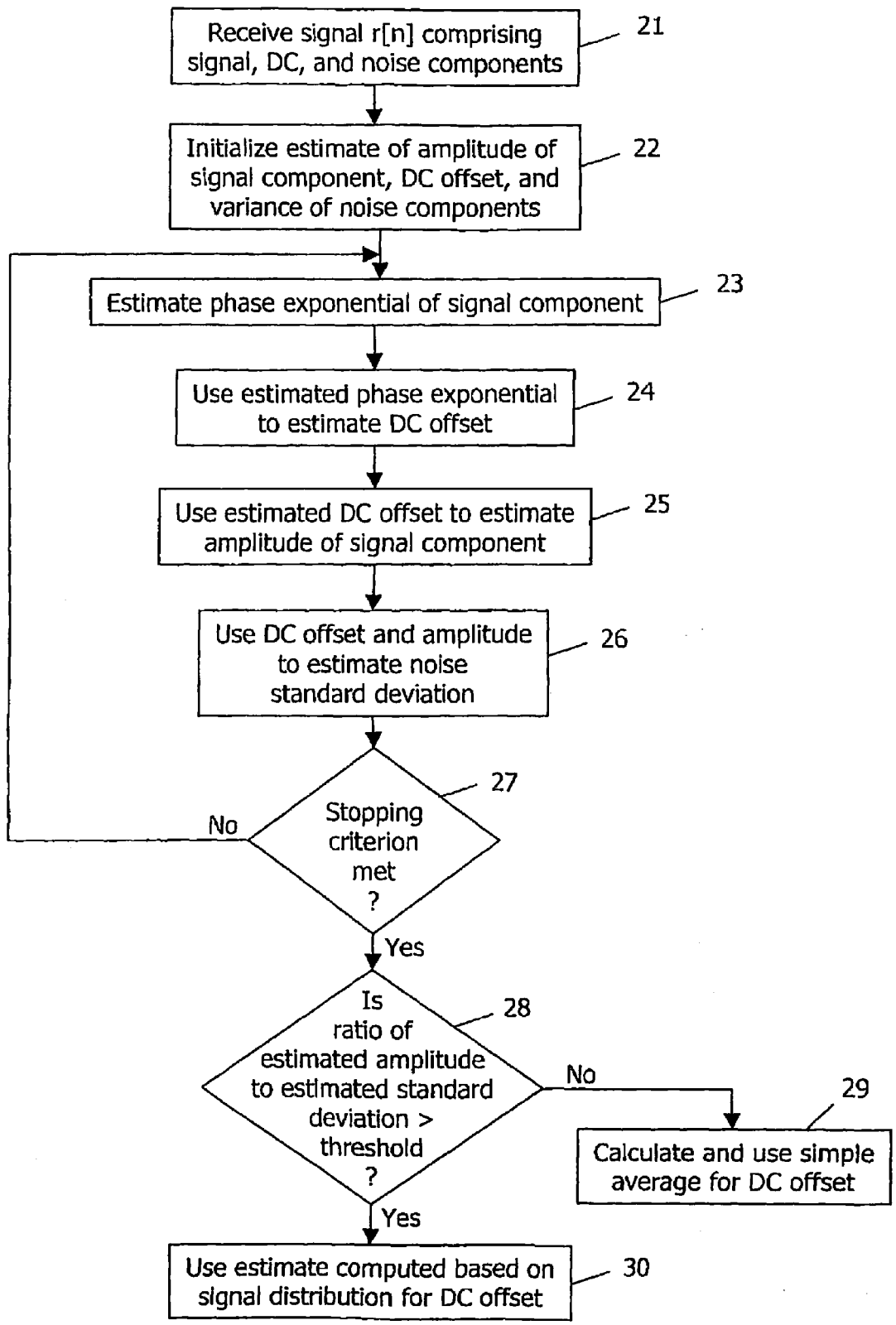
FIG. 2 is a flow chart illustrating the steps of a second embodiment of the method of the present invention.

FIG. 2 is a flow chart illustrating the steps of a second embodiment of the method of the present invention. In the second embodiment, the order of some of the steps is reversed. Specifically, after estimating the complex exponential of the phase of the signal component, the estimate of the phase exponential is used to estimate the DC offset, and then the estimated DC offset is used to estimate the amplitude of the signal component. The estimated DC offset and the amplitude are then used to calculate the noise variance.

Thus, at step 21, a signal r[n] is received comprising a digitally modulated signal component, a DC offset component, and a noise component. At this point, the process initializes the iteration index m=0 and at step 22, initializes the joint estimate ($\hat{a}^{(0)}$, $\hat{d}^{(0)}$, $\hat{\sigma}^{(0)}$), preferably as:

$\hat{a}^{(0)} = \overline{r[n]}, \hat{d}^{(0)} = \overline{|r[n] - \hat{a}^{(0)}|}$, and $(\hat{\sigma}^{(0)})^2 = \overline{|r[n] - \hat{a}^{(0)}|^2} - (\hat{d}^{(0)})^2$.

At step 23, the process estimates the complex exponential of the phase of the signal component. The process computes the estimate of u[n] for n=1,2,Λ,N as:

$$\hat{u}[n] = \frac{I_1\left(2\frac{\hat{a}^{(m)}|r[n] - \hat{d}^{(m)}|}{(\hat{\sigma}^{(m)})^2}\right)}{I_0\left(2\frac{\hat{a}^{(m)}|r[n] - \hat{d}^{(m)}|}{(\hat{\sigma}^{(m)})^2}\right)} e^{j \text{ang}(r[n] - \hat{d}^{(m)})} \quad (7)$$

where ang(x) denotes the phase of the complex number x in the interval [0,2π] and $I_k(z)$ denotes the kth order modified Bessel functions of the first kind. At step 24, the estimated phase exponential is used to estimate the DC offset, and at step 25, the estimated DC offset is used to estimate the amplitude of the signal component. At step 26, the DC offset and the amplitude are then used to calculate the noise variance, $\sigma^2$. The process may update the joint estimate as:

$$\hat{d}^{(m+1)} = \overline{r[n]} - \hat{a}^{(m)}\overline{\hat{u}[n]}$$

$$\hat{a}^{(m+1)} = \text{Re}\{\overline{\hat{u}^*[n](r[n] - \hat{d}^{(m+1)})}\}^+$$

$$(\hat{\sigma}^{(m+1)})^2 = \overline{|r[n] - \hat{d}^{(m+1)}|^2} - (\hat{a}^{(m+1)})^2 \quad (8)$$

where $z^+$ is equal to z if z>0 and is equal to 0 if z≦0 for any real number z.

At step 27, it is determined whether a stopping criterion has been met. As in the first embodiment, the stopping criterion may be, for example, a number of iterations such as two iterations, or a more numerical criterion may be utilized such as when the ratio between the variance in the current step and the variance in the previous step stabilizes or falls below a predefined threshold. If the stopping criterion has not been met, the process increments m and returns to step 23.

If the stopping criterion has been met, the process moves to step 28 where an adaptive selection is made between the simple average and the DC estimate produced by the present invention by determining whether or not the ratio of the estimated amplitude to the estimated noise standard deviation is greater than a predefined threshold value. If not, the process moves to step 29 where the simple average is calculated and used for the DC offset. However, if the ratio of the estimated amplitude to the estimated noise standard deviation is greater than the pre-defined threshold, the process moves to step 30 where the DC estimate produced by the present invention is utilized.

As described above in connection with the first embodiment, the adaptive selection between the simple average and the DC estimate produced by the present invention may alternatively be based on the log likelihood test.

The invention may also be extended to other Non-Gaussian probability distributions of the modulated signal. Consider the following generalized signal model:

$$r[n] = x_\alpha[n] + d + v[n], \quad (9)$$

$$x_\alpha[n] = f(u[n], \alpha), \quad (10)$$

for n=1,2,Λ,N, where r[n] denotes the received signal; $x_\alpha[n]$ denotes the digital remodulation of the signal where α denotes some parameter(s) of the digitally remodulated signal; d is the DC offset that the invention estimates from the received signal; and v[n] is noise. For the model, v[n] is assumed to be Gaussian noise. Equation (9) is the most general form of the equation. Equation (10) further defines the digital remodulation of the signal, $x_\alpha[n]$. In equation (10), $f(.,.)$ denotes a certain function that characterizes the probability distribution of the digitally modulated signal; α denotes the model parameter that lies in a certain constraint set Γ (e.g. for the constant envelope model (1) Γ={a:a≧0}); and $\{u[n]\}_{n=1}^N$ denotes an innovation process of known probability distribution.

Figure 3:
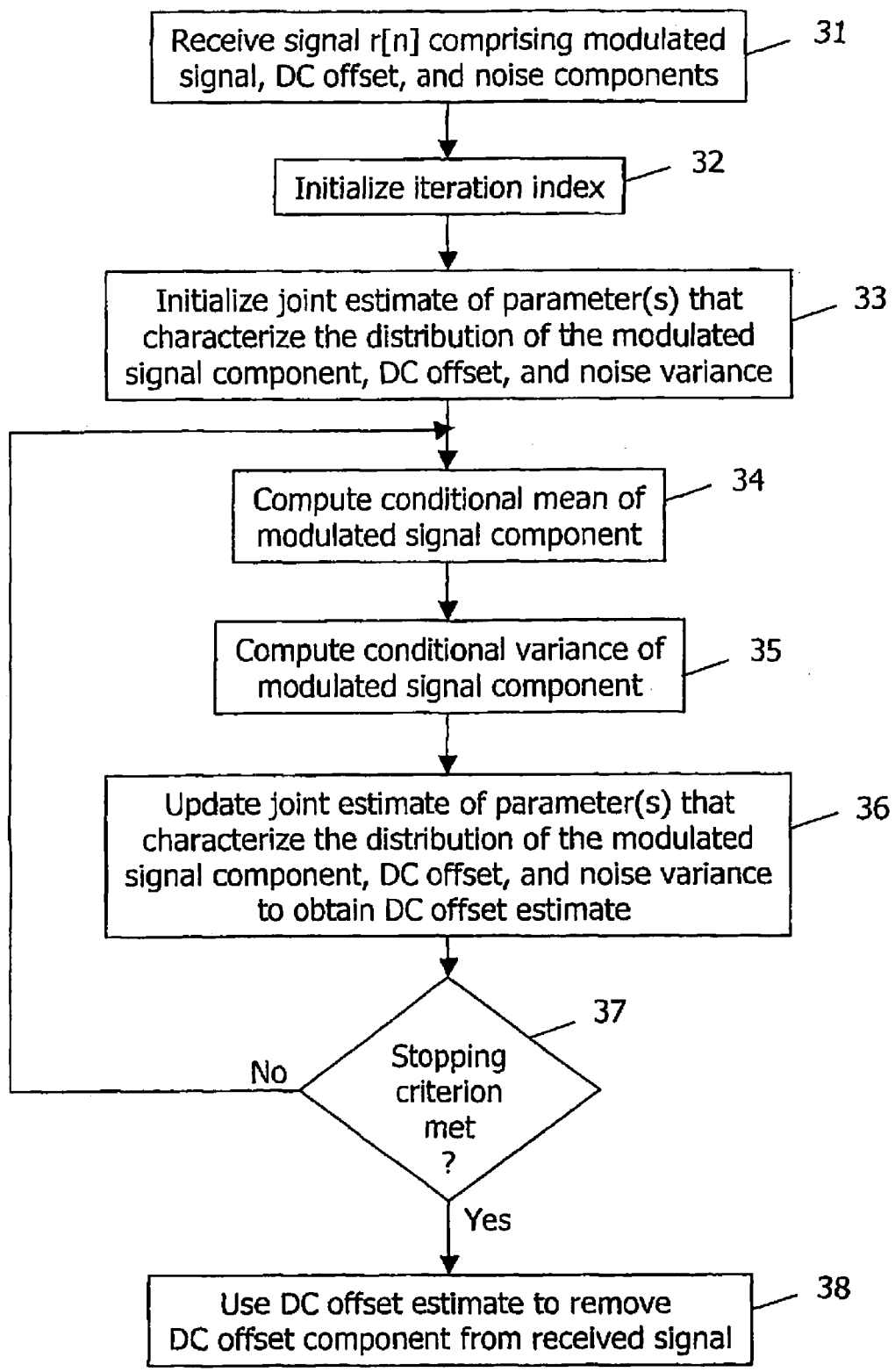
FIG. 3 is a flow chart illustrating the steps of a third embodiment of the method of the present invention.

FIG. 3 is a flow chart illustrating the steps of a third embodiment of the method of the present invention. The third embodiment addresses probability distributions of the modulated signal other than Gaussian. At step 31, a signal r[n] is received comprising a digitally modulated signal component, a DC offset component, and a noise component. At step 32, the iteration index is initialized, m=0, and at step 33, a joint estimate is initialized of parameters $(\hat{a}^{(0)}, \hat{d}^{(0)}, \hat{\sigma}^{(0)})$ that characterize the distribution of the modulated signal component, the DC offset, and the noise variance. At step 34, the process then computes the conditional mean of the digitally modulated signal component $x_\alpha[n]$ for n=1,2,Λ,N given $\{r[n]\}_{n=1}^N$ and the previous estimate $(\hat{a}^{(m)}, \hat{d}^{(m)}, \hat{\sigma}^{(m)})$. The conditional mean is denoted by:

$$E(x_\alpha[n]|m) \equiv E[x_\alpha[n] | \{r[k]\}_{k=1}^N, \hat{a}^{(m)}, \hat{\alpha}^{(m)}, \hat{\sigma}^{(m)}]. \quad (11)$$

At step 35, the process computes the conditional variance of $x_\alpha[n]$ for n=1,2,Λ,N given $\{r[n]\}_{n=1}^N$ and the previous estimate $(\hat{a}^{(m)}, \hat{d}^{(m)}, \hat{\sigma}^{(m)})$. The conditional variance is denoted by:

$$\text{var}(x_\alpha[n]|m) \equiv E[|x_\alpha[n] - E(x_\alpha[n]|m)|^2 | \{r[k]\}_{k=1}^N, \hat{a}^{(m)}, \hat{\alpha}^{(m)}, \hat{\sigma}^{(m)}]. \quad (12)$$

At step 36, the process then updates the estimate of the parameters $(\hat{a}^{(m+1)}, \hat{d}^{(m+1)}, \hat{\sigma}^{(m+1)})$ as:

$$\hat{a}^{(m+1)} = \arg\min_{\alpha \in \Gamma} \hat{\sigma}(\alpha) \quad (13)$$

$$\hat{d}^{(m+1)} = \overline{r[n] - E[x_{\hat{a}^{(m+1)}}[n] | m]} \quad (14)$$

$$(\hat{\sigma}^{(m+1)})^2 = [\hat{\sigma}(\hat{a}^{(m+1)})]^2 \quad (15)$$

where $$\hat{\sigma}(\alpha) \equiv \overline{|r[n] - E[x_\alpha[n] | m] - (\overline{r[n] - E[x_\alpha[n] | m]})|^2} + \overline{\text{var}(x_\alpha[n] | m)}. \quad (16)$$

This results in an estimate of the DC offset. At step 37, it is determined whether a stopping criterion has been met. If the predefined stopping criterion is not satisfied, the process increments the iteration index m and returns to step 34. If the stopping criterion is satisfied, the process moves to step 38 where the estimated DC offset is utilized to remove the DC offset component from the received signal.

As in the first and second embodiments, the stopping criterion may be, for example, a number of iterations such as two iterations, or a more numerical criterion may be utilized such as when the ratio between the variance in the current step and the variance in the previous step stabilizes or falls below a predefined threshold.

Figure 4:
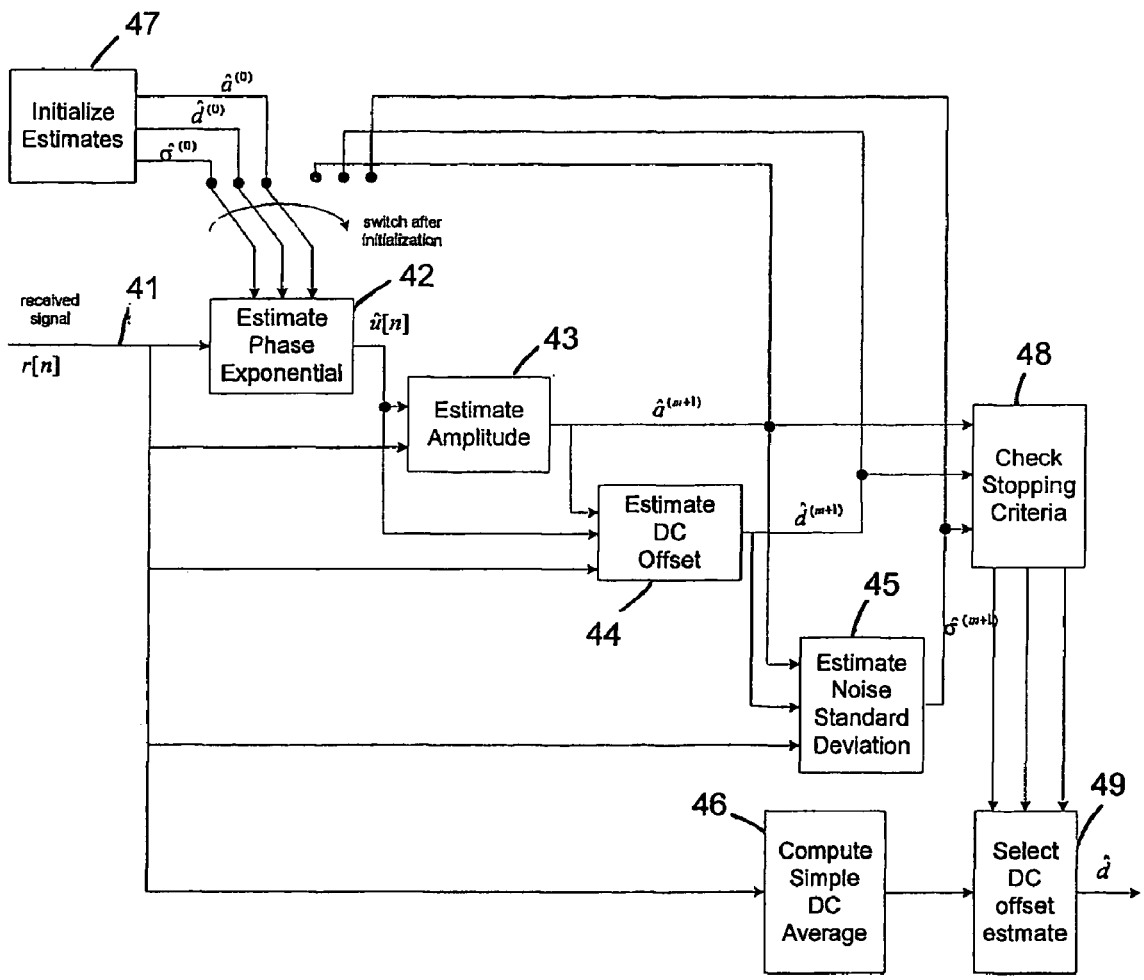
FIG. 4 is a simplified functional block diagram of a system for performing the first embodiment of the present invention.

FIG. 4 is a simplified functional block diagram of a system for performing the first embodiment of the present invention. The system receives a signal r[n] 41 comprising a digitally modulated signal component, a DC offset component, and a noise component, and sends the signal to a phase exponential estimator 42, an amplitude estimator 43, a DC offset estimator 44, a noise variation estimator 45, and a simple DC average computation unit 46. An initialization unit 47 initializes the iteration index m=0 and initializes the joint estimate $(\hat{a}^{(0)}, \hat{d}^{(0)}, \hat{\sigma}^{(0)})$ as discussed above in relation to FIG. 1. The phase exponential estimator 42 then uses the joint estimate ($\hat{a}^{(0)}, \hat{d}^{(0)}, \hat{\sigma}^{(0)}$) to estimate the complex exponential of the phase, u[n], of the signal component. The estimated phase exponential, u[n], is passed to the amplitude estimator 43 where it is utilized to estimate the amplitude, $\hat{a}^{(m)}$, of the signal component.

The estimated amplitude, $\hat{a}^{(m)}$, is passed to the DC offset estimator 44 where it is utilized to estimate the DC offset, $\hat{d}^{(m)}$. The estimated amplitude, $\hat{a}^{(m)}$, and the estimated DC offset, $\hat{d}^{(m)}$, are passed to the noise variation estimator 45 where they are utilized to estimate the noise standard deviation, $\hat{\sigma}^{(m)}$. The estimated amplitude, $\hat{a}^{(m)}$, the estimated DC offset, $\hat{d}^{(m)}$, and the estimated noise standard deviation, $\hat{\sigma}^{(m)}$, are passed to a stopping criteria checking unit 48 where it is determined whether the stopping criterion has been met. If the stopping criterion has not been met, the system repeats the estimations of blocks 42-45. If the stopping criterion has been met, an adaptive selection unit 49 determines whether to utilize the simple DC average or the DC estimate produced by the system. As noted above, this determination may be made by determining whether the ratio of the estimated amplitude to the estimated noise standard deviation is greater than a predefined threshold value. If not, the system calculates and utilizes the simple average for the DC offset. However, if the ratio of the estimated amplitude to the estimated noise standard deviation is greater than the pre-defined threshold, the system utilizes the DC estimate produced by the system. The adaptive selection unit may alternatively base the selection on the log likelihood test described above.

Figure 5:
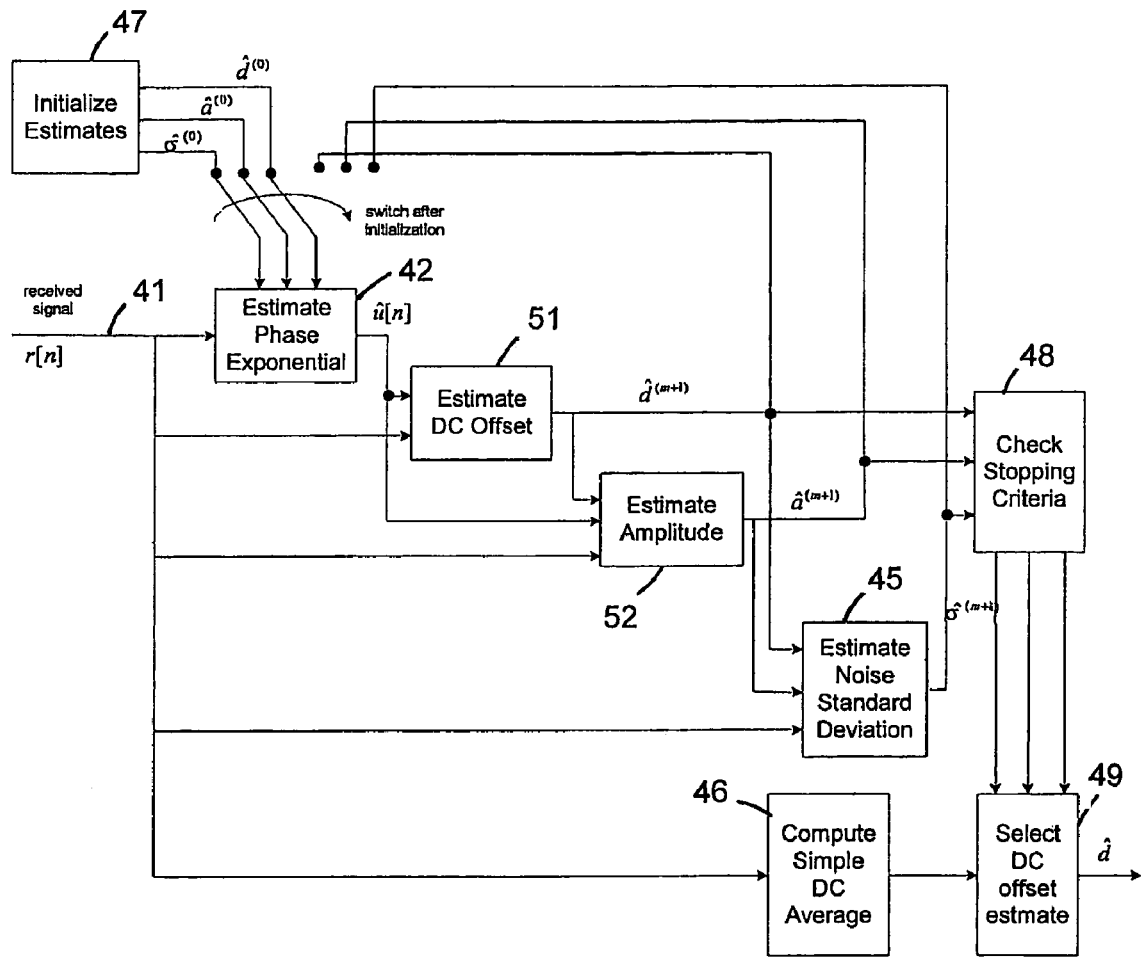
FIG. 5 is a simplified functional block diagram of a system for performing the second embodiment of the present invention.

FIG. 5 is a simplified functional block diagram of a system for performing the second embodiment of the present invention. In the second embodiment, the order of some of the processing steps is reversed. Specifically, after estimating the complex exponential of the phase of the signal component, the estimate of the phase exponential is used to estimate the DC offset, and then the estimated DC offset is used to estimate the amplitude of the signal component. The estimated DC offset and the amplitude are then used to calculate the noise standard deviation.

The system receives the signal r[n] 41 comprising a digitally modulated signal component, a DC offset component, and a noise component, and sends the signal to the phase exponential estimator 42, a DC offset estimator 51, an amplitude estimator 52, the noise variation estimator 45, and a simple DC average computation unit 46. The initialization unit 47 initializes the iteration index m=0 and initializes the joint estimate ($\hat{a}^{(0)}, \hat{d}^{(0)}, \hat{\sigma}^{(0)}$) as discussed above. The phase exponential estimator 42 then uses the joint estimate ($\hat{a}^{(0)}, \hat{d}^{(0)}, \hat{\sigma}^{(0)}$) to estimate the complex exponential of the phase, u[n], of the signal component. The estimated phase exponential, u[n], is passed to the DC offset estimator 51 where it is utilized to estimate the DC offset, $\hat{d}^{(m)}$.

The estimated DC offset, $\hat{d}^{(m)}$, is passed to the amplitude estimator 52 where it is utilized to estimate the amplitude, $\hat{a}^{(m)}$, of the signal component. The estimated amplitude, $\hat{a}^{(m)}$, and the estimated DC offset, $\hat{d}^{(m)}$, are passed to the noise variation estimator 45 where they are utilized to estimate the noise standard deviation, $\hat{\sigma}^{(m)}$. The estimated amplitude, $\hat{a}^{(m)}$, the estimated DC offset, $\hat{d}^{(m)}$, and the estimated noise standard deviation, $\hat{\sigma}^{(m)}$, are passed to the stopping criteria checking unit 48 where it is determined whether the stopping criterion has been met. If the stopping criterion has not been met, the system repeats the estimations of blocks 42, 51, 52, and 45. If the stopping criterion has been met, an adaptive selection unit 49 determines whether to utilize the simple DC average or the DC estimate produced by the system, as discussed above.

Figure 6:
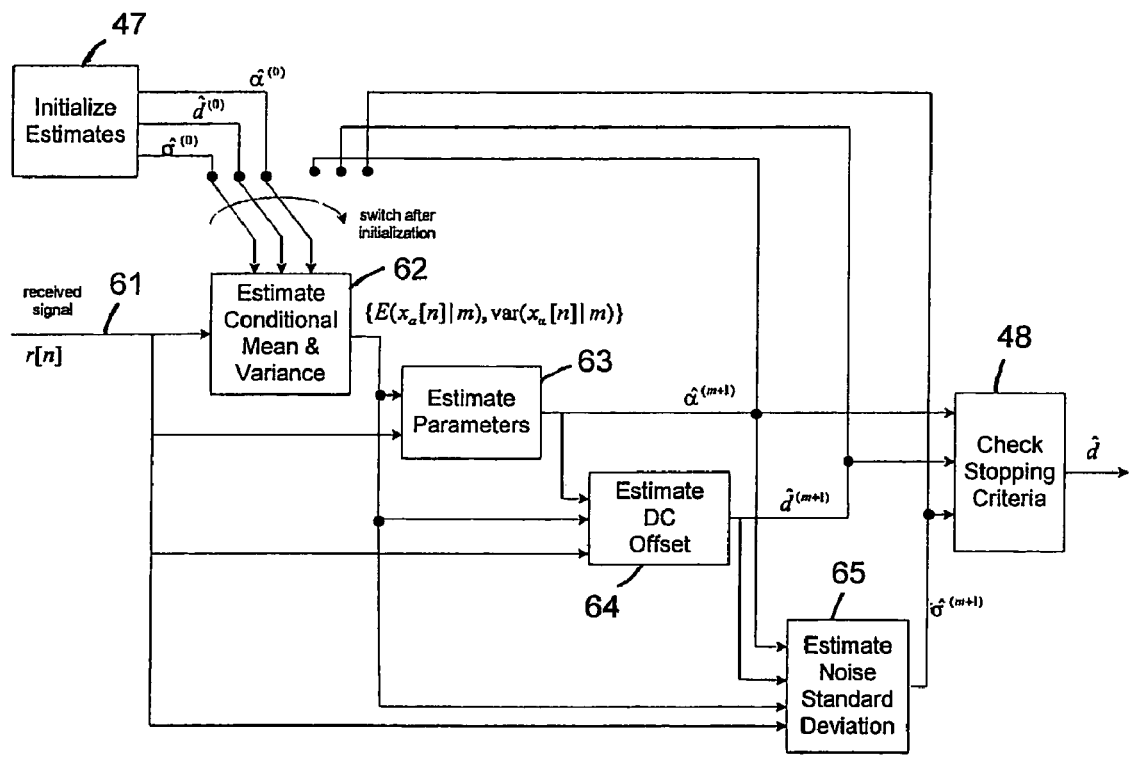
FIG. 6 is a simplified functional block diagram of a system for performing the third embodiment of the present invention.

FIG. 6 is a simplified functional block diagram of a system for performing the third embodiment of the present invention. In the third embodiment, the system addresses probability distributions of the modulated signal other than Gaussian. The system receives a signal r[n] 61 comprising a digitally modulated signal component, a DC offset component, and a noise component, and sends the signal to a conditional mean and variance estimator 62. The initialization unit 47 initializes the iteration index m=0 and initializes the joint estimate ($\hat{a}^{(0)}, \hat{d}^{(0)}, \hat{\sigma}^{(0)}$) as discussed above. The conditional mean and variance estimator then utilizes the joint estimate ($\hat{a}^{(0)}, \hat{d}^{(0)}, \hat{\sigma}^{(0)}$) to estimate the conditional mean and the conditional variance of the digitally modulated signal component $x_\alpha[n]$ for $n=1,2,\Lambda,N$ given $\{r[n]\}_{n=1}^{N}$ and the previous estimate ($\hat{a}^{(m)}, \hat{d}^{(m)}, \hat{\sigma}^{(m)}$). The conditional mean and variance are passed to a parameter estimator 63 where they are utilized to update the estimate of the parameters $\hat{\alpha}^{(m+1)}$ of a postulate of the statistical distribution of the digitally modulated signal component.

The conditional mean and variance, and the updated parameters, $\hat{\alpha}^{(m+1)}$ are then passed to a DC offset estimator 64 where they are utilized to estimate the DC offset, $\hat{d}^{(m+1)}$. The estimated parameters, $\hat{\alpha}^{(m+1)}$, the estimated DC offset, $\hat{d}^{(m+1)}$, and the conditional mean and variance are passed to a noise variation estimator 65 where they are utilized to estimate the noise standard deviation, $\hat{\sigma}^{(m+1)}$. The estimated parameters, $\hat{\alpha}^{(m+1)}$, the estimated DC offset, $\hat{d}^{(m+1)}$, and the estimated noise standard deviation, $\hat{\sigma}^{(m+1)}$, are passed to the stopping criteria checking unit 48 where it is determined whether the stopping criterion has been met. If the stopping criterion has been met, the system outputs the estimated DC offset. If the stopping criterion has not been met, the system repeats the estimations of blocks 62-65 in further iterations until the stopping criterion is met.

The invention is derived based on the theory of expectation-maximization (EM) for computing the joint ML estimate of (d,a,σ) in an iterative manner given the received signal $\{r[n]\}_{n=1}^{N}$. All three embodiments described above improve the DC offset estimate after each iteration. The third embodiment is derived based on the general signal model given in equations (9) and (10). The first and second embodiments are derived for the special case where $f(u[n],\alpha)=\alpha u[n]$, and where the model parameter α is simply the amplitude a of the constant-envelope signal in the signal model of equation (1).

The theory of the EM algorithm states that the joint ML estimate can be obtained by iteratively computing the following equation:

$$(\hat{d}^{(m+1)}, \hat{a}^{(m+1)}, \hat{\sigma}^{(m+1)}) \equiv \arg\max_{(d,\alpha,\sigma)} Q^{(m)}(d, \alpha, \sigma) \quad (17)$$

where $$Q^{(m)}(d, \alpha, \sigma) \equiv E\left[\ln p\left(\begin{array}{c}\{r[n]\}_{n=1}^{N} \mid \\ \{u[n]\}_{n=1}^{N}, d, \alpha, \sigma\end{array}\right) \Bigg| \{r[n]\}_{n=1}^{N}, \hat{d}^{(m)}, \hat{a}^{(m)}, \hat{\sigma}^{(m)}\right]$$

$$= -N\ln(\pi\sigma^2) - \frac{E\left[\sum_{n=1}^{N}|r[n] - x_\alpha[n] - d|^2 \Bigg| \{r[n]\}_{n=1}^{N}, \hat{d}^{(m)}, \hat{a}^{(m)}, \hat{\sigma}^{(m)}\right]}{\sigma^2}.$$

Using the definitions in equations (11) and (12), equation (16) can be rewritten as:

$$Q^{(m)}(d, \alpha, \sigma) = -N\ln(\pi\sigma^2) - \frac{E\left[\sum_{n=1}^{N}\left|\begin{pmatrix}r[n]-d-\\E[x_\alpha[n]\mid m]\end{pmatrix}-\\(x_\alpha[n]-E[x_\alpha[n]\mid m])\end{pmatrix}\right|^2\right]}{\sigma^2}$$

$$= -N\ln(\pi\sigma^2) - \frac{\sum_{n=1}^{N}\left[\left|\begin{matrix}r[n]-d-\\E[x_\alpha[n]\mid m]\end{matrix}\right|^2+\\ \text{var}[x_\alpha[n]\mid m]\right]}{\sigma^2}$$

For fixed $\alpha$ and $\sigma$, differentiating $Q^{(m)}(d,\alpha,\sigma)$ with respect to d and setting the derivative to zero yields the best d for the given $\alpha$:

$$\hat{d}(\alpha) = \overline{r[n]} - \overline{E[x_\alpha[n]\mid m]}. \quad (18)$$

Substituting equation (18) into $Q^{(m)}(d,\alpha,\sigma)$ and optimizing it over $\sigma$ for a fixed $\alpha$ yields equation (16). Substituting equations (18) and (16) into $Q^{(m)}(d,\alpha,\sigma)$, it can be seen that the best $\alpha$ is given by:

$$\hat{\alpha} = \arg\max_{\alpha\in\Gamma} Q^{(m)}(\hat{d}(\alpha), \alpha, \hat{\sigma}(\alpha))$$
$$= \arg\max_{\alpha\in\Gamma}\{-N\ln\pi e\hat{\sigma}(\alpha)\}$$
$$= \arg\min_{\alpha\in\Gamma}\hat{\sigma}(\alpha),$$

which is the same as equation (13). With the best $\alpha$, the process can produce the best d and the best $\sigma$ using equations (18) and (16). This process yields equations (14) and (15), respectively.

For the special case of focus herein, where $\alpha=a$, $\Gamma=\{\alpha: \alpha\geq 0\}$, and $f(u[n],\alpha)=\alpha u[n]$, it can be shown in a straightforward manner that:

$$\hat{u}[n] \equiv E[u[n]\mid m] = \frac{I_1\left(2\frac{\hat{a}^{(m)}|r[n]-\hat{d}^{(m)}|}{(\hat{\sigma}^{(m)})^2}\right)}{I_0\left(2\frac{\hat{a}^{(m)}|r[n]-\hat{d}^{(m)}|}{(\hat{\sigma}^{(m)})^2}\right)}e^{j\text{ang}(r[n]-\hat{d}^{(m)})},$$

(which yields equation (3)) and $\text{var}[u[n]\mid m]=1-|E[u[n]\mid m]|^2$. Substituting these conditional expectations into equation (16) and then equation (13), and optimizing over all $\alpha\geq 0$, gives equation (4). Substituting this best $\alpha$ into equations (14) and (15) leads to equations (5) and (6), respectively. This completes the derivation of the equations utilized in the first embodiment. The derivation of the equations utilized in the second embodiment is similar, except that it is based on a generalized EM algorithm where the update for the DC offset estimate, as shown in equation (8), is first fixed using the amplitude estimate from the previous iteration, instead of being jointly optimized with the updates for $\alpha$ and $\sigma$ at each iteration.

FIGS. 7-12 are graphical representations of various performance criteria, comparing the results of the present invention against the simple DC average method and an ideal situation in which there is no DC offset. In FIGS. 7-10, the bottommost (dotted) line represents ideal performance in which there is no DC offset. The uppermost line, and thus the poorest in performance, represents error performance provided by the simple DC estimate of averaging the received signal over the entire burst. The three intermediate lines, moving downward, represent error performance achieved by one, two, and eight iterations, respectively, of the present invention. As shown in these figures, the first iteration of the present invention achieves the most gain of any single iteration. After the second iteration, most of the potential gain has been realized.

Figure 7:
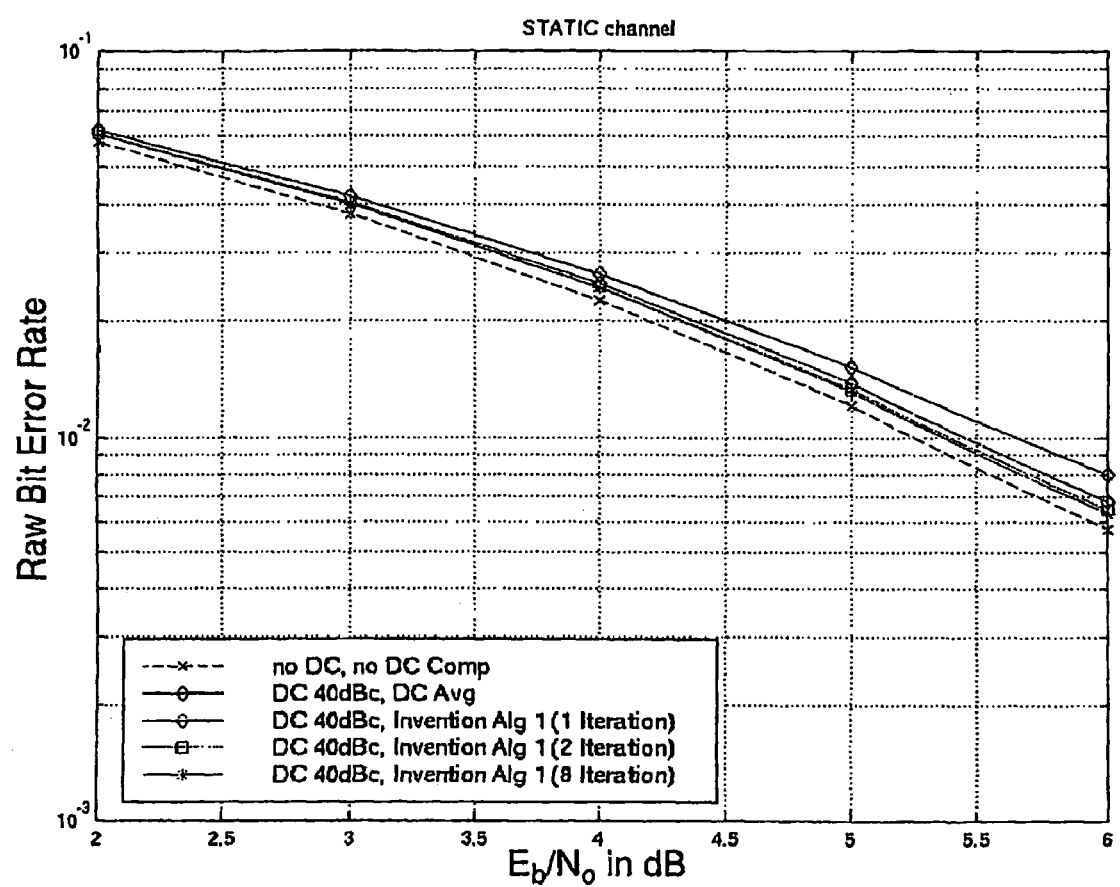
FIG. 7 is a graphical representation of raw bit error rate as a function of SNR when using the first embodiment of the present invention with a static AWGN channel.

FIG. 7 is a graphical representation of raw bit error rate as a function of SNR ($E_b/N_o$) when using the first embodiment of the present invention with a static AWGN channel.

Figure 8:
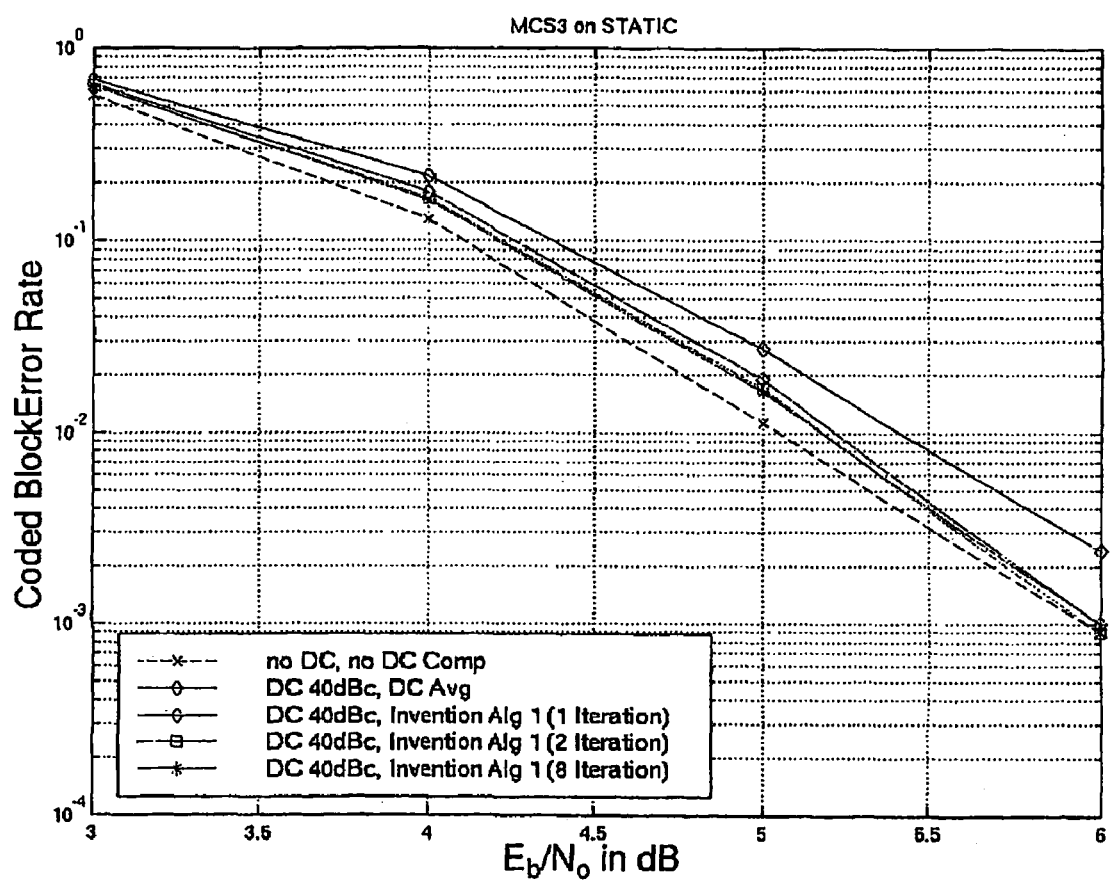
FIG. 8 is a graphical representation of MCS3-coded block error rate as a function of SNR when using the first embodiment of the present invention with a static AWGN channel.

FIG. 8 is a graphical representation of MCS3-coded block error rate as a function of SNR ($E_b/N_o$) when using the first embodiment of the present invention with a static AWGN channel.

Figure 9:
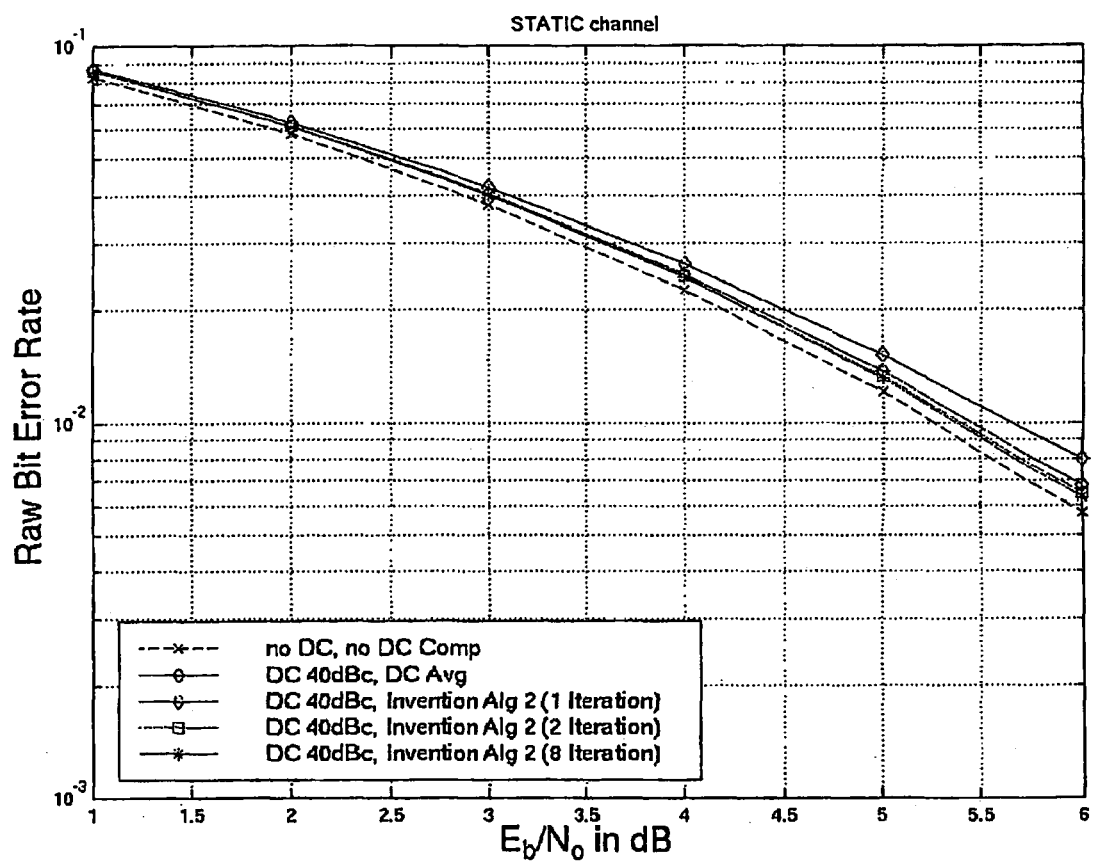
FIG. 9 is a graphical representation of raw bit error rate as a function of SNR when using the second embodiment of the present invention with a static AWGN channel.

FIG. 9 is a graphical representation of raw bit error rate as a function of SNR ($E_b/N_o$) when using the second embodiment of the present invention with a static AWGN channel.

Figure 10:
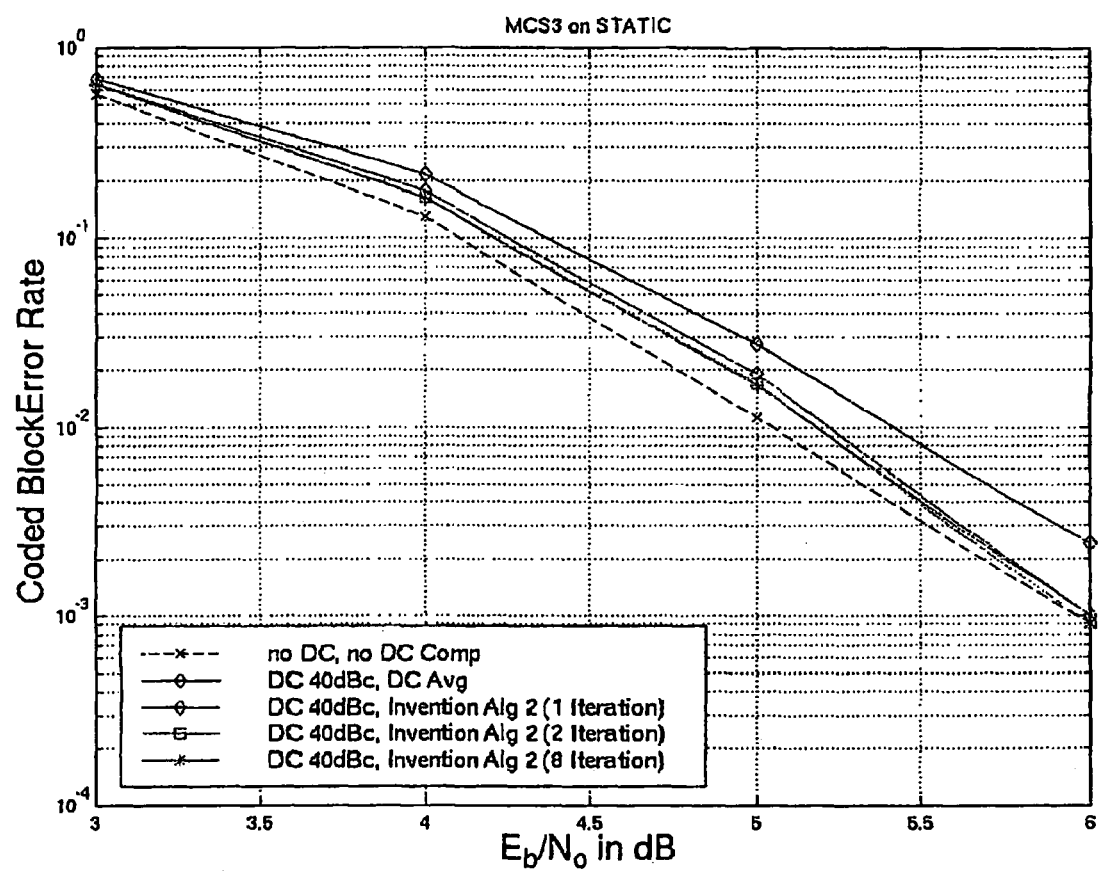
FIG. 10 is a graphical representation of MCS3-coded block error rate as a function of SNR when using the second embodiment of the present invention with a static AWGN channel.

FIG. 10 is a graphical representation of MCS3-coded block error rate as a function of SNR ($E_b/N_o$) when using the second embodiment of the present invention with a static AWGN channel.

As shown, the invention provides gain over the entire range of SNR. As expected, however, the invention provides more gain in the high SNR region. At low SNR, the relative contributions of the first and third terms of equation (1) are shifted so that the noise contribution becomes more important. When the noise term, which is Gaussian, is large compared to the first term, the advantage provided by the present invention is reduced because the overall distribution is very close to Gaussian. Thus at low SNR, the simple average is close to optimal. However, at higher SNRs, where the first term dominates in relation to the third term, the exploitation of the probability distribution of the first term provides significantly more gain.

Compared to the simple DC estimate of averaging the received signal over the entire burst, a gain of about 0.3 dB can be achieved with the invention at 10% raw bit error rate. It can be seen that the second embodiment performs comparably with the first embodiment. Hence, the second embodiment may be preferred in practice, since it has somewhat lower computational complexity than the first embodiment.

Figure 11:
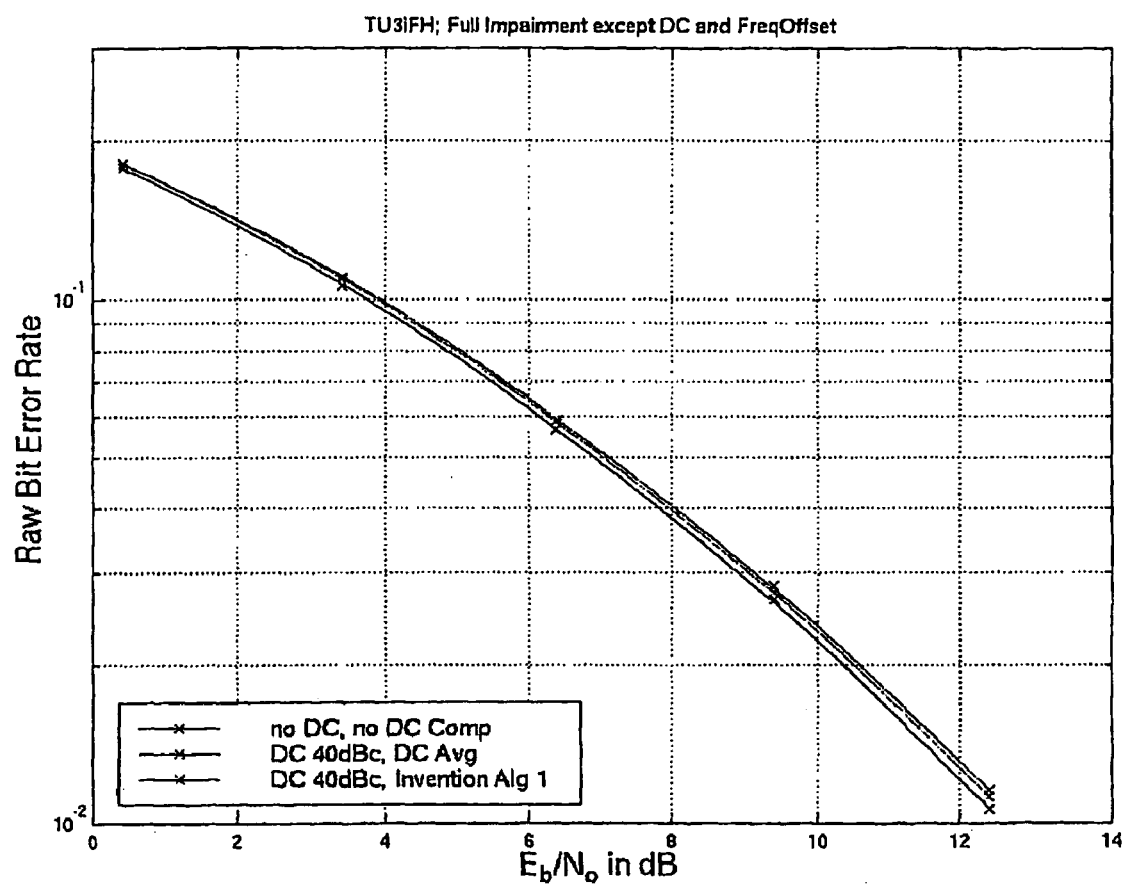
FIG. 11 is a graphical representation of raw bit error rate as a function of SNR when using the first embodiment of the present invention with a Typical Urban channel at a speed of 3 km/hr.

FIG. 11 is a graphical representation of raw bit error rate as a function of SNR ($E_b/N_o$) when using the first embodiment of the present invention with a Typical Urban (TU) channel at a speed of 3 km/hr. Although the channel dispersion tends to destroy the constant envelope property of the desired signal, the invention still provides a gain of about 0.1 dB over the simple DC averaging method.

Figure 12:
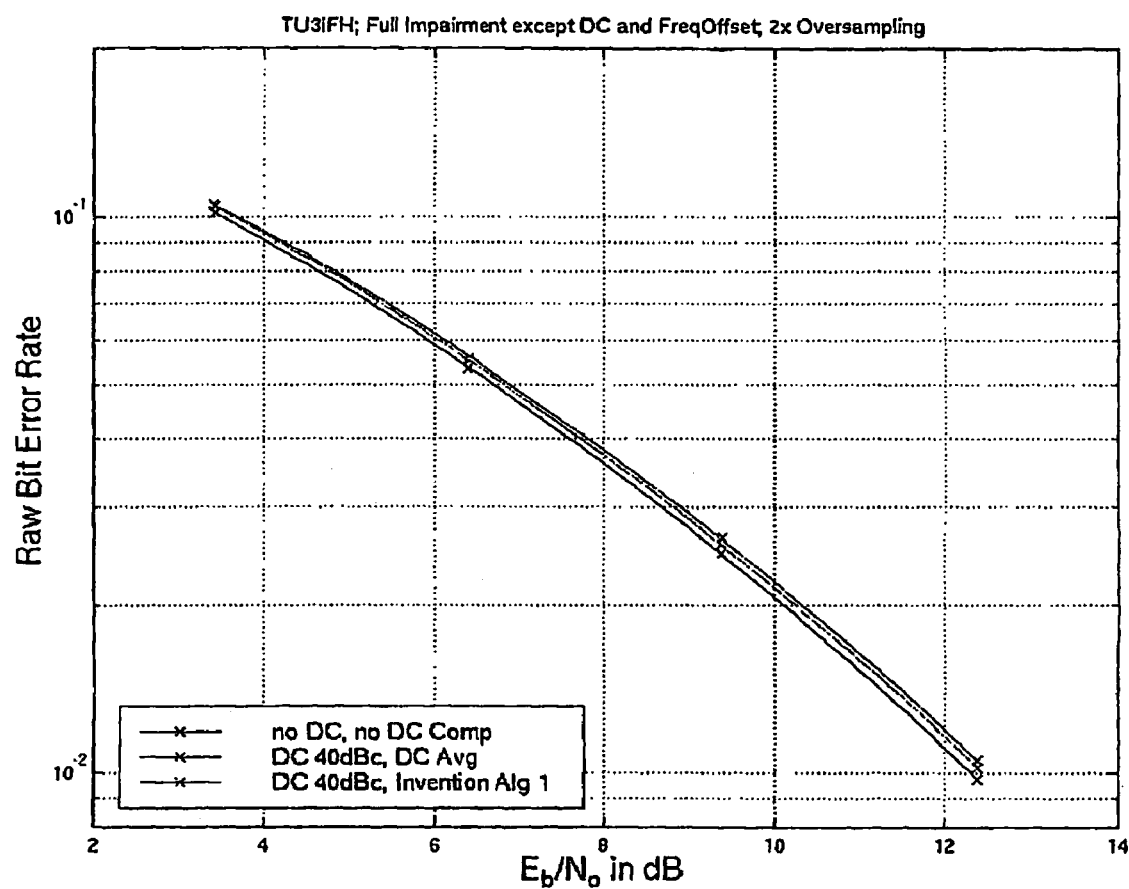
FIG. 12 is a graphical representation of MCS3-coded block error rate as a function of SNR when using the first embodiment of the present invention with a Typical Urban channel and a 2-time oversampled signal.

FIG. 12 is a graphical representation of MCS3-coded block error rate as a function of SNR ($E_b/N_o$) when using the first embodiment of the present invention with a Typical Urban (TU) channel and a 2-time oversampled signal. In this case, the number of received samples available for estimating the DC offset is doubled. The invention again provides a gain of about 0.1 dB over the simple DC averaging method.

Those skilled in the art will readily appreciate that the present invention may be implemented using either hardware, or software, or both, and further, software implementations may vary using different languages and data structures. The present invention is not limited to a specific language and/or class of languages, nor is it limited to any single data structure implantation.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of estimating a DC offset for a signal received in a radio receiver, wherein the received signal includes a digitally modulated signal component, a DC offset component, and a noise component, said digitally modulated signal component having a statistical distribution, said method comprising:
   estimating by a parameter estimator, at least one parameter of a postulate of the statistical distribution of the digitally modulated signal component;
   estimating by a DC offset estimator, the DC offset utilizing the at least one estimated parameter of the postulate of the statistical distribution of the digitally modulated signal component;
   determining by a stopping criteria checking unit, whether a predefined stopping criterion has been met;
   if the predefined stopping criterion has been met, subtracting the estimated DC offset from the received signal;
   if the predefined stopping criterion has not been met:
      estimating by a noise variation estimator, the standard deviation of the noise component; and
      repeating the steps of estimating the at least one parameter of the postulate of the statistical distribution of the digitally modulated signal component, and estimating the DC offset until the predefined stopping criterion is met;
   determining by a comparator, whether a ratio of a chosen one of the estimated parameter(s) to the estimated noise standard deviation is greater than a pre-defined threshold value;
   if the ratio is greater than the predefined threshold value, utilizing the estimated DC offset; and
   if the ratio is not greater than the predefined threshold value, calculating and utilizing an average value of the received signal over a received burst to estimate the DC offset.

2. A method of estimating a DC offset for a signal received in a radio receiver, wherein the received signal includes a digitally modulated signal component, a DC offset component, and a noise component, said digitally modulated signal component having a substantially constant amplitude, said method comprising:
   (a) initializing by an initialization unit, an iteration index;
   (b) initializing by the initialization unit, estimates of the DC offset, the amplitude of the digitally modulated signal component, and the standard deviation of the noise component;
   (c) estimating by a phase exponential estimator, a complex exponential of the phase of the digitally modulated signal component;
   (d) updating by an amplitude estimator, the estimate of the amplitude of the digitally modulated signal component utilizing a result of step (c); and
   (e) updating by a DC offset estimator, the estimate of the DC offset utilizing the results of steps (c) and (d).

3. The method of claim 2, further comprising:
   (f) updating by a noise variation estimator, the standard deviation of the noise component for further processing of the received signal.

4. The method of claim 1, wherein step (f) includes updating the standard deviation of the noise component utilizing the values of the received signal, the updated estimate of the DC offset, and the updated estimate of the amplitude of the digitally modulated signal component.

5. The method of claim 1, wherein step (c) includes estimating the complex exponential of the phase of the digitally modulated signal component for multiple time instants utilizing values of the received signal and previous estimates of the amplitude of the digitally modulated signal component, the DC offset, and the standard deviation of the noise component.

6. The method of claim 2, wherein step (d) includes updating the estimate of the amplitude of the digitally modulated signal component utilizing values of the received signal and the estimates of the complex exponential of the phase of the digitally modulated signal component.

7. The method of claim 2, wherein step (e) includes updating the estimate of the DC offset utilizing the values of the received signal, the updated estimate of the amplitude of the digitally modulated signal component, and the estimate of the complex exponential of the phase of the digitally modulated signal component.

8. The method of claim 2, further comprising:
   (g) determining by a stopping criteria checking unit, whether a predefined stopping criterion has been met;
   if the predefined stopping criterion has been met:
      (h) subtracting the estimated DC offset from the received signal; and
   if the predefined stopping criterion has not been met:
      (i) incrementing the iteration index;
      (f) estimating the standard deviation of the noise component; and
      (j) repeating steps (c), (d), (e) and (g) until the predefined stopping criterion is met.

9. A method of estimating a DC offset for a signal received in a radio receiver, wherein the received signal includes a digitally modulated signal component, a DC offset component, and a noise component, said digitally modulated signal component having a substantially constant amplitude, said method comprising
   (a) initializing by an initialization unit, an iteration index;
   (b) initializing by the initialization unit, estimates of the DC offset, the amplitude of the digitally modulated signal component, and the standard deviation of the noise component;
   (c) estimating by a phase exponential estimator, a complex exponential of the phase of the digitally modulated signal component; and
   (d) updating by a DC offset estimator, the estimate of the DC offset utilizing a result of step (c); and
   (e) updating by an amplitude estimator, the estimate of the amplitude of the digitally modulated signal component utilizing the results of steps (c) and (d); and
   (f) updating by a noise variation estimator, the standard deviation of the noise component utilizing a result of step (e).

10. The method of claim 9, wherein step (c) includes estimating the complex exponential of the phase of the digitally modulated signal component for multiple time instants utilizing values of the received signal and previous estimates of the amplitude of the digitally modulated signal component, the DC offset, and the standard deviation of the noise component.

11. The method of claim 9, wherein step (d) includes updating the estimate of the DC offset utilizing the values of the received signal, a previous estimate of the amplitude of the digitally modulated signal component, and the estimate of the complex exponential of the phase of the digitally modulated signal component.

12. The method of claim 9, wherein step (e) includes updating the estimate of the amplitude of the digitally modulated signal component utilizing values of the received signal, the estimate of the complex exponential of the phase of the digitally modulated signal component, and the updated estimate of the DC offset.

13. The method of claim 9, wherein step (f) includes updating the standard deviation of the noise component utilizing the values of the received signal, the updated estimate of the DC offset, and the updated estimate of the amplitude of the digitally modulated signal component.

14. The method of claim 9, further comprising:
(g) determining by a stopping criteria checking unit, whether a predefined stopping criterion has been met;
if the predefined stopping criterion has been met:
(h) subtracting the estimated DC offset from the received signal; and
if the predefined stopping criterion has not been met:
(i) incrementing the iteration index;
(f) estimating the standard deviation of the noise component; and
(j) repeating steps (c), (d), (e), and (g) until the predefined stopping criterion is met.

15. A method of estimating a DC offset for a signal received in a radio receiver, wherein the received signal includes a digitally modulated signal component having a statistical distribution, a DC offset component, and a noise component, said method comprising:
initializing by an initialization unit, an iteration index;
initializing by the initialization unit, a joint estimate of at least one parameter of a postulate of the statistical distribution of the digitally modulated signal component, the DC offset, and the noise variance;
estimating by a conditional mean and variance estimator, a conditional mean and a conditional variance of the digitally modulated signal component of the received signal utilizing the initial joint estimate in a first iteration;
updating by a parameter estimator, the joint estimate utilizing the estimated conditional mean and conditional variance; and
estimating by a DC offset estimator, the DC offset utilizing the updated joint estimate and the estimated conditional mean and conditional variance; and
determining by a stopping criteria checking unit, whether a predefined stopping criterion has been met;
if the predefined stopping criterion has been met, subtracting the estimated DC offset from the received signal; and
if the predefined stopping criterion has not been met:
incrementing the iteration index;
estimating the noise standard deviation utilizing the updated joint estimate, the estimated conditional mean and variance, and the estimated DC offset; and
repeating the steps of estimating the conditional mean and conditional variance, updating the joint estimate, and estimating the DC offset until the predefined stopping criterion is met.

16. An arrangement in a radio receiver for estimating a DC offset for a received signal, wherein the received signal includes a digitally modulated signal component having a statistical distribution, a DC offset component, and a noise component, said arrangement comprising:
means for estimating at least one parameter of a postulate of the statistical distribution of the digitally modulated signal component;
means for estimating the DC offset utilizing the at least one estimated parameter of the postulate of the statistical distribution of the digitally modulated signal component;
means for determining whether a predefined stopping criterion has been met;
means, responsive to a determination that the predefined stopping criterion has been met, for subtracting the estimated DC offset from the received signal;
means, responsive to a determination that the predefined stopping criterion has not been met, for repeating the operations of the parameter estimating means, the DC offset estimating means, and the noise standard deviation estimating means until the stopping criterion is met;
an adaptive selection unit for determining whether to utilize the DC estimate produced by the arrangement or a simple DC average calculated over a received burst, wherein the adaptive selection unit includes:
means for determining whether a ratio of a chosen one of the estimated parameter(s) to the estimated noise standard deviation is greater than a pre-defined threshold value;
means for selecting the estimated DC offset produced by the arrangement if the ratio is greater than the predefined threshold value; and
means for calculating and selecting the simple DC average if the ratio is not greater than the predefined threshold value.

17. An arrangement in a radio receiver for estimating a DC offset for a received signal, wherein the received signal includes a digitally modulated signal component having a substantially constant amplitude, a DC offset component, and a noise component, said arrangement comprising:
means for initializing an iteration index;
an initialization unit for initializing estimates of the DC offset, the amplitude of the digitally modulated signal component, and the standard deviation of the noise component;
a phase exponential estimator for estimating a complex exponential of the phase of the digitally modulated signal component;
an amplitude estimator for updating the estimate of the amplitude of the digitally modulated signal component utilizing the estimated complex exponential of the phase of the digitally modulated signal component; and
a DC offset estimator for updating the estimate of the DC offset utilizing the estimated complex exponential of the phase of the digitally modulated signal component and the estimated amplitude.

18. The arrangement of claim 17, further comprising a noise variation estimator for updating the standard deviation of the noise component for use in further processing of the received signal.

19. The arrangement of claim 18, wherein the noise variation estimator includes means for updating the standard deviation of the noise component utilizing the values of the received signal, the updated estimate of the amplitude of the digitally modulated signal component, and the updated estimate of the DC offset.

20. The arrangement of claim 18, wherein the phase exponential estimator includes means for estimating the complex exponential of the phase of the digitally modulated signal component for multiple time instants utilizing values of the received signal and previous estimates of the amplitude of the digitally modulated signal component, the DC offset, and the standard deviation of the noise component.

21. The arrangement of claim 17, further comprising:
means for determining whether a predefined stopping criterion has been met;

means, responsive to a determination that the predefined stopping criterion has been met, for subtracting the estimated DC offset from the received signal; and means, responsive to a determination that the predefined stopping criterion has not been met, for:
incrementing the iteration index;
updating the standard deviation of the noise component; and
repeating the operations of the phase exponential estimator, the amplitude estimator, and the DC offset estimator until the predefined stopping criterion is met.

22. An arrangement in a radio receiver for estimating a DC offset for a received signal, wherein the received signal includes a digitally modulated signal component having a substantially constant amplitude, a DC offset component, and a noise component, said arrangement comprising:
means for initializing an iteration index;
an initialization unit for initializing estimates of the DC offset, the amplitude of the digitally modulated signal component, and the standard deviation of the noise component;
a phase exponential estimator for estimating a complex exponential of the phase of the digitally modulated signal component; and
a DC offset estimator for updating the estimate of the DC offset utilizing the estimated complex exponential of the phase of the digitally modulated signal component; and
an amplitude estimator for updating the estimate of the amplitude of the digitally modulated signal component utilizing the estimated complex exponential of the phase of the digitally modulated signal component and the estimated DC offset; and
a noise variation estimator for updating the standard deviation of the noise component for use in further processing of the received signal.

23. The arrangement of claim 22, wherein the noise variation estimator includes means for updating the standard deviation of the noise component utilizing the values of the received signal, the updated estimate of the DC offset, and the updated estimate of the amplitude of the digitally modulated signal component.

24. The arrangement of claim 22, wherein the phase exponential estimator includes means for estimating the complex exponential of the phase of the digitally modulated signal component for multiple time instants utilizing values of the received signal and previous estimates of the amplitude of the digitally modulated signal component, the DC offset, and the standard deviation of the noise component.

25. The arrangement of claim 22, further comprising:
means for determining whether a predefined stopping criterion has been met;
means, responsive to a determination that the predefined stopping criterion has been met, for subtracting the estimated DC offset from the received signal; and
means, responsive to a determination that the predefined stopping criterion has not been met, for:
incrementing the iteration index;
updating the estimate of the amplitude of the digitally modulated signal component;
updating the standard deviation of the noise component; and
repeating the operations of the phase exponential estimator, and the DC offset estimator until the predefined stopping criterion is met.

* * * * *